Patented July 26, 1949

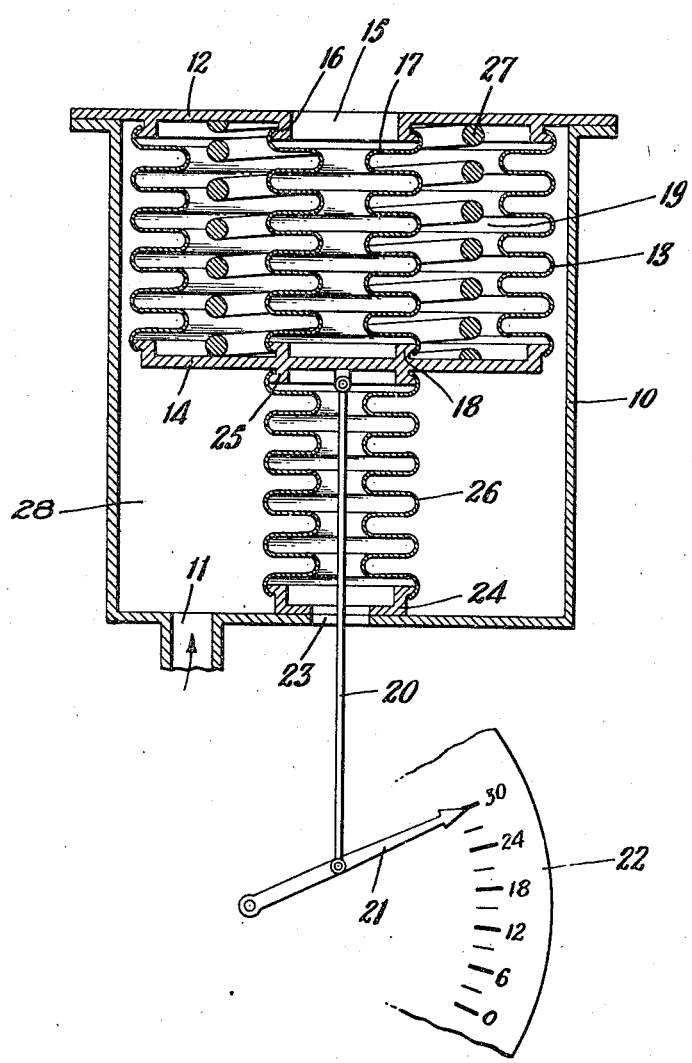

2,477,233

UNITED STATES PATENT OFFICE 2,477,233

APPARATUS FOR MEASURING ABSOLUTE PRESSURE

Carlton W. Bristol, Naugatuck, Conn., assignor to The Bristol Company, Waterbury, Conn., a corporation of Connecticut Application October 9, 1944, Serial No. 557,851

3 Claims. (Cl. 73—393)

This invention relates to the measurement of absolute pressure. An object is to provide apparatus of simple and inexpensive construction which at the same time provides for absolute pressure measurement with particular effectiveness and precision. A further object is to provide such apparatus wherein errors due to temperature changes are eliminated.

Other features and advantages of the invention will be hereinafter described and claimed.

The accompanying drawing, illustrates in vertical section, with parts in side elevation, a form of apparatus embodying the invention.

Referring to the drawing, there is shown at 10 a casing or chamber having an opening 11 for connection to the source of pressure to be measured. Suitably sealed to the top 12 of the casing is a bellows 13, the lower end of which is sealed to a plate 14.

The top plate 12 of the casing 10 has an opening 15 therein. Surrounding said opening, and sealed at its upper end to a flange 16 depending from said top plate, is a bellows 17 of substantially smaller diameter than the bellows 13. The lower end of said bellows 17 is sealed to a suitable flange 18 on the plate 14.

The chamber 19 between the bellows 13 and 17 is exhausted of air. Preferably, it is, as nearly as possible, completely evacuated of fluid pressure.

Extending from the plate 14 is a link 20, which connects said plate to suitable means for exhibiting the value of the pressure measured. Such means may take any suitable form, such as a pen for recording on a clockwork-driven chart, or a pointer 21, movable along a scale 22.

The bottom plate of the casing 10 is provided with an opening 23 through which the link 20 passes and which is open to the atmosphere. Sealed at its lower end to a flange 24 on said bottom plate, and at its upper end to a flange 25 depending from the plate 14, is a bellows 26 of the same diameter as the bellows 17 and positioned directly below the latter. Through the provision of the bellows members 17 and 26, the plate 14 is subjected over equal areas on its opposite sides to atmospheric pressure, so that said pressure has no effect upon said plate. At the same time, the bellows 26 forms a packless seal for enabling the movements of the plate 14 to be transmitted to the pointer 21.

It will, of course, be apparent that, if desired, the link 20 may extend through bellows 17, instead of bellows 26, for operating a suitable indicator element.

Upward movement of the bellows 13 and plate 14 under the influence of the pressure supplied through the opening 11 is resisted by a spring 27 in the chamber 19, said spring bearing at one end on the top plate 12 of the casing 10, and at its other end on said plate 14.

In operation, the plate 14, under the opposing forces provided by the spring 27 and the pressure applied through the opening 11, is positioned in accordance with the magnitude or value of that pressure, so that said value is indicated on the scale 22 by the pointer 21. The arrangement of the bellows members 17 and 26, in communication with the atmosphere, enables motion of the plate 14 to be transmitted freely, and without friction, to the pointer 21, while at the same time avoiding interference by atmospheric pressure with the desired measurement. In prior arrangements for measuring absolute pressures it has been necessary to provide compensating links and levers to correct the measurement for changes in surrounding atmospheric conditions. My invention requires no such compensating mechanism, since the movement of the plate 14 is directly proportional to the absolute pressure of the medium being measured in the chamber 28 and is not affected by changes in the surrounding atmosphere. The embodiment illustrated provides a simple, compact, and efficient apparatus for the measurement of absolute pressure with particular precision.

A further feature of the invention lies in the fact that it eliminates the necessity for careful matching of bellows units. In other devices for the same purpose, it is customary to make use of a pair of pressure-responsive members of identical characteristics, one of these being exhausted and the other subjected to the pressure under measurement. In such cases the identity of these elements must be assured by careful matching in the course of manufacture. While the smaller bellows members 17 and 26 should be of the same cross-sectional area, it has been found that, because of the relatively small part of the working area represented by their closed section, bellows units selected from the ordinary run of production are sufficiently alike to reduce to negligible magnitude any errors which might be traced to differences in their characteristics or dimensions.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. An absolute pressure measuring device, comprising a housing, a movable member therein, means comprising a plurality of bellows attached to said member and to portions of said housing for defining within said housing an exhausted chamber on one side of said movable member and a pair of chambers on opposite sides of said member, the chambers of said pair being of the same cross-sectional area and communicating with atmospheric pressure, both chambers of said pair being of smaller diameter than said exhausted chamber, said housing having means for applying the pressure to be measured to a portion of said movable member exteriorly said exhausted chamber, a spring in said exhausted chamber resisting movement of said member by said pressure, and means outside said housing and connected to said movable member for movement to positions corresponding to values of said pressure.

2. An absolute pressure measuring device, comprising a housing, a movable member therein, a pair of bellows of the same cross-sectional area sealed to opposite faces of said member and to portions of said housing, each of said bellows being in communication with atmospheric pressure at its end opposite said member, a third bellows surrounding one of said pair of bellows and sealed to said movable member and to a portion of said housing for defining therewith a chamber from which fluid pressure is exhausted, said housing having means for applying the pressure to be measured to the exterior of said third bellows and one of said pair of bellows, a spring in said exhausted chamber resisting movement of said movable member by said pressure, and means outside said housing and connected to said movable member for movement to positions corresponding to values of said fluid pressure.

3. An absolute pressure measuring device comprising a housing having openings in opposite end walls, a movable member in said housing, a bellows sealed at one end to an end wall of said housing and at its opposite end to one side of said member and in communication with the atmosphere through one of said end wall openings, a second bellows sealed at one end to said side of said movable member and at its opposite end to said end wall of said housing, said second bellows surrounding said first mentioned bellows and cooperating therewith and with said housing and said member for defining an exhausted chamber on said side of said member, a third bellows of the same cross-sectional area as the first mentioned bellows, said third bellows being sealed at one end to the opposite side of said movable member and at the other end to the opposite end wall of said housing, said third bellows being in communication with the atmosphere through said opposite end wall, means for admitting the pressure to be measured into said housing to act upon the last mentioned side of said movable member, a spring in said exhausted chamber opposing movement of said movable member by said pressure, means connected to said movable member and extending through one of said end wall openings of said housing, and an element outside said housing shiftable by said movable member through said connecting means to positions corresponding to said fluid pressure.

CARLTON W. BRISTOL.

REFERENCES CITED

The following references are of record in the file of this patent:

UNITED STATES PATENTS

| Number | Name | Date |
| --- | --- | --- |
| 1,074,306 | Wolf | Sept. 30, 1913 |
| 1,753,469 | Melas | Apr. 8, 1930 |
| 2,079,069 | Johnson | May 4, 1937 |
| 2,325,091 | Allwein et al. | July 27, 1943 |